United States Patent [19]

Greven

[11] Patent Number: 5,062,340
[45] Date of Patent: Nov. 5, 1991

[54] CUTTING AND POSITIONING APPARATUS

[76] Inventor: Richard Greven, 1015 Linda Vista Dr., Bldg. C, San Marcos, Calif. 92069

[21] Appl. No.: 541,790

[22] Filed: Jun. 21, 1990

[51] Int. Cl.$^5$ .................. B32B 31/18; B32B 31/08
[52] U.S. Cl. .......................................... 83/95; 83/157; 83/277; 83/371; 83/422; 156/197; 271/168; 493/344; 493/966
[58] Field of Search ................. 83/95, 206, 210, 157, 83/277, 367, 371, 422, 94; 271/84, 85, 168; 493/966, 344, 204; 156/197, 474, 513

[56] References Cited

U.S. PATENT DOCUMENTS

| | | | |
|---|---|---|---|
| 3,006,798 | 10/1961 | Holland | 156/197 |
| 3,242,024 | 3/1966 | Bova et al. | 156/197 |
| 3,519,510 | 7/1970 | Ardolino et al. | 156/297 |
| 3,713,954 | 1/1973 | Clark et al. | 156/197 X |
| 3,797,341 | 3/1974 | Bystron | 83/422 X |
| 4,301,700 | 11/1981 | Greven | 83/91 |
| 4,375,175 | 3/1983 | Elsas et al. | 83/364 X |
| 4,422,357 | 12/1983 | Larsen | 83/371 X |

Primary Examiner—Frank T. Yost
Assistant Examiner—Kenneth E. Peterson
Attorney, Agent, or Firm—Stephen E. Feldman

[57] ABSTRACT

Apparatus for cutting a continuous web into precise length sheets and precisely stacking the sheets, relative to each other, includes first and second moving endless belt tables for advancing the web, a sheet orientation table and a stacking table. A vacuum holds the web firmly, without tension, against the respective belts. A shearing device is disposed between the first and second endless belts. Web, detectors positioned along the line of travel of the web, detect printed or colored lines on the web to obtain accurately cut sheets. Individually driven and positioned sheet grippers grasp the cut sheet positioning each sheet under dual hole punching devices which punch precisely positioned holes in each sheet. A pair of aligning pins on a sheet stacking bed are used as guides for orienting the sheets in interleave configuration. Each sheet is secured to its adjacent sheet to maintain sheet orientation.

9 Claims, 2 Drawing Sheets

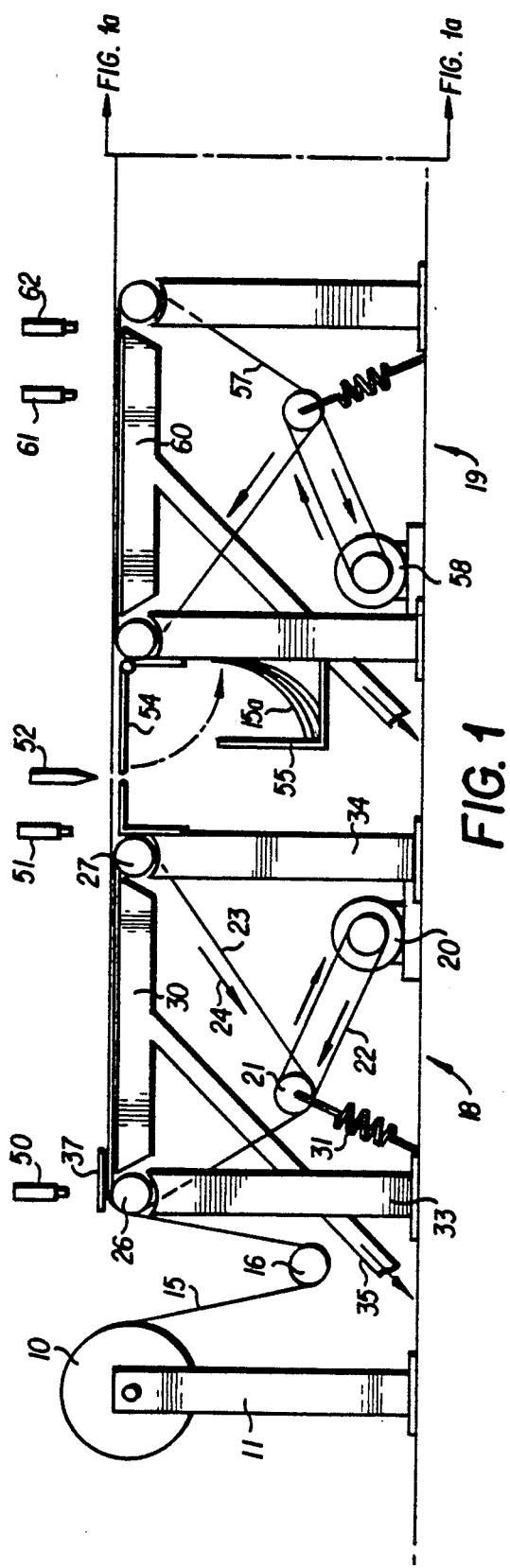
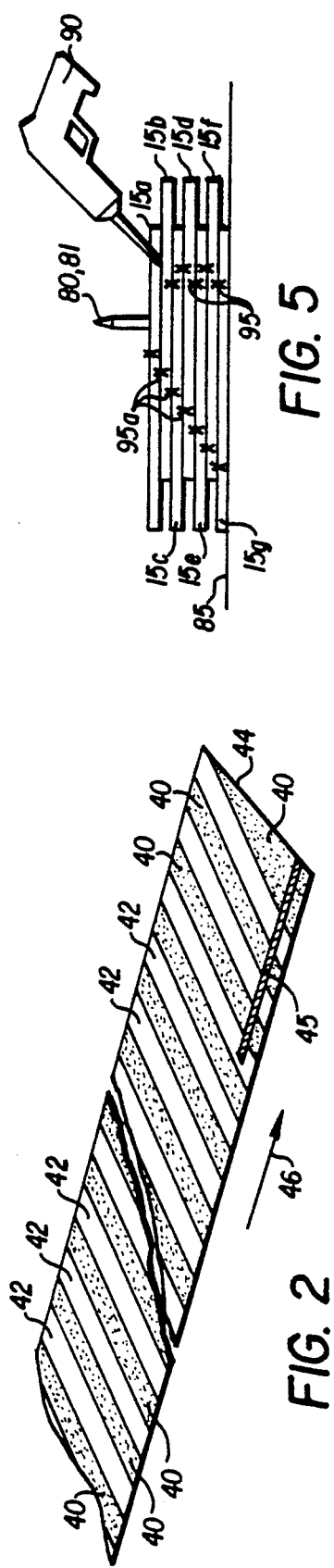

CUTTING AND POSITIONING APPARATUS

BACKGROUND OF THE INVENTION

1. Field of the Invention

The present invention relates to apparatus for cutting and separating sheets of accurate length from long lengths of sheet or web material and for stacking each sheet in a very accurate position relative to printed lines on the sheet and on an adjacent sheet on the stack of sheets.

Although the apparatus of the present invention has wide application it is particularly suited for cutting, separating and accurately stacking sheets of web material, such as paper or cloth, for example, or metal material such as aluminum, for example, in the preparation of forming an uniform cellular structure, for example, a honeycomb mass or block.

2. Prior Art

It is well known to form a uniform cellular structure or block, such as a honeycomb mass or block, by cutting sheets from a continuous web on which has previously been applied, adhesive, cement or glue stripes, in a precise predetermined pattern across one surface of the web and stacking the sheets one on top of the other. The stack of sheets with the adhesive stripes on a common surface are subjected to pressure and heat to activate and/or cure the adhesive so that each sheet becomes adhered to its adjacent sheet in a particular pattern so that the sheets, when separated, form a cellular block with each cell of the structure the same shape and size.

U.S. Pat. No. 4,301,700 issued Nov. 24, 1881 discloses a cutting apparatus suited particularly for cutting sheets of very accurate length from a long, continuous supply of web, metal or other material generally used for preparing stacks of sheets used in making cellular blocks.

It has been found that in the manmaking honeycomb process, accuracy and uniformity in the spacing and width of the adhesive or cement stripes or lines set down on surface of the web or metal material used, the cutting to length and stacking of the cut sheets and the positioning of each sheet relative to its adjacent sheet are extremely important for the generation of a block of a man-made honeycomb, with uniform cells.

The adhesive, glue or cement stripes or lines may be applied to a long sheet or web across its width, i.e., perpendicular to the length of the web. The adhesive may be an epoxy, applied to the web in a liquid form using, for example, a printer. After the adhesive lines are printed across the web, the adhesive material printed on the web is dried so as to make the adhesive dormant.

State of the art printers print adhesive lines in a sharply defined pattern, relative to width of adhesive line, the spacing between adhesive lines and repetition of the pattern along the web or other material.

The width of the adhesive lines and the spacing between lines is a function of the size of the cell in the honeycomb mass to be manufactured. For example a honeycomb block made up from ⅛ inch cells may be generated by using adhesive stripes or lines 0.070 inches wide with a spacing of 0.280 inches between adhesive stripes or lines.

U.S. Pat. No. 4,301,700 teaches apparatus for cutting a continuous web into sheets of the same predetermined length, repetitively, by feeding the a continuous material on to an aligning table which aligns the continuous material without subjecting the material to a tension which may injure the adhesive stripes on the material. The continuous material is held flattened and stiffened at or near the termination point of the material. The continuous material or web may then be sheared or cut across its width by a conventional cutter to form a termination of the material.

SUMMARY OF THE INVENTION

The present invention provides improved apparatus for handling the material of a continuous web or other material prior to cutting the continuous web into sheets of accurate length. The invention includes a novel approach for offset stacking of the cut sheets and a novel apparatus for maintaining the offset relation between adjacent sheet in the stack when the stack of sheets is removed from the stacking table and during curing of the adhesive for cementing adjacent sheets together.

In general, a long roll, sometimes referred to as a continuous roll, of material such as a web or flexible material such a paper, for example or thin metal, such as aluminum, for example is pre-processed. The preprocessing includes placing stripes of an adhesive or cement in predetermined pattern, on a common face of the continuous roll.

As previously stated the material may be a web material such as cloth or paper or other web or, may be a metallic material, such as thin aluminum or other metallic foil or other material. For convenience, such material will be referred to as web, without limitation intended.

Each stripe of adhesive or cement set down across the face of the web is sharply defined in width and spacing. This may be accomplished by passing the length of the web through a printer which prints an adhesive stripe such as an epoxy in liquid form, on to the surface of the web. The adhesive or cement stripe is then dried by passing the printed portion of the web through a conventional drier. The web is then re-rolled to facilitate handling. However, the web may proceed to the rest of processing without rerolling.

In the process of printing the adhesive on the face of the web, a second, nonadhesive stripe is laid down along the edge of the web, at the start of the web, at the finish or end of the web and at any recognized defect, to indicate both the start of the web and the end of the web and any portion of the web that appears to be defective. This second line or stripe runs parallel to the edge of the web.

The roll of the web material is placed on a stand or retainer so that the web may be unrolled. In some cases the stand includes a drive mechanism of a conventional type, for example or the web may be pulled off the roll by other means.

The end of the web is fed to a table having a moving surface such as an endless belt, which moves the web forward or downstream.

The present invention includes at least first and second endless belt tables each in the form of a vacuum table. Each table has a vacuum manifold located under the top of the table, which is a moving surface formed by the upper surface of the endless belt. The endless belt, which is a porous belt, seals the manifold so that the vacuum pulls through the belt and holds the web firmly, but without tension, against the surface of the belt. This vacuum hold assists the moving belt in advancing the web uniformly.

With the web held firmly against the moving belt by the vacuum exerted through the manifold, the moving belt carries the web forward. When the endless belt travels beyond the influence of the vacuum against the belt, the web continues its forward movement.

Downstream from the first vacuum table, in the direction of travel of the web, is positioned a cutting or shearing apparatus for cutting the web into sheets.

Along the first endless belt table, at a position adjacent and upstream from the web shearing mechanism, is a first sensor, such as a photo sensor or electric eye sensitive to change in color, for example. This sensor is positioned to detect any stripe placed along the longitudinal edge of the web and to provide an output when such stripe passes through the zone of sensitivity of the sensor. A signal, generated in response to actuation of this first sensor, alerts a second sensor positioned just downstream from the cutting apparatus. This signal also slows down the motor driving the endless belt carrying forward this section of the web.

When the second sensor, which may be similar to the first sensor, detects the stripe on the longitudinal edge of the web, a signal is generated by the second sensor which causes the motor driving the endless belt to stop. This stops the forward movement of the web. A trapdoor, downstream from the cutting apparatus, for receiving waste cut off the web is also opened. The cutting apparatus shears the web perpendicular to the line of travel of the web, forming a waste piece forward of the cut.

The waste piece cut from the continuous web will be disposed of by dropping the piece through the trapdoor into a container. The trapdoor will then be closed and the motor driving the endless belt will be started so that the first or upstream table will continue moving the web forward or downstream.

When another stripe along the longitudinal edge of the web appears, the process to remove waste will be repeated.

Downstream from the shearing apparatus is a second endless moving belt table. Over this second table are two sensor devices, spaced a short distance from each other in the direction of travel of the web. Both sensors may be photo sensors designed to distinguish between light and dark, or contrasting color for example. The first of this pair, or the third sensor, is positioned upstream from the second of this pair or the fourth sensor. The third sensor looks for the leading edge of the web. When the leading edge of the web is detected by the third sensor, a signal is provided which signals the motors driving the moving belt on both tables to be slowed down and when the fourth sensor detects the same leading edge of the web, the motors are stopped so that the belt drive carrying the web is stopped. The cutting apparatus then cuts the web forming a cut piece laying downstream from the cutting apparatus. The function of the third and fourth sensors is to precisely stop the downstream advance of the web so that the web can be cut to an accurate length. After being cut, the cut piece is advanced by the second moving belt toward a fifth sensor. The fifth sensor may be a photo sensor that is actuated by or detects the leading edge of the cut sheet or some characteristic on the sheet and provides a signal in response thereto. The fifth sensor is positioned downstream from the second endless moving belt table. Upon actuation, the fifth sensor provides a signal used to stop the advance of the cut sheet.

The fifth sensor could be any type of detector or sensor that is actuated by the cut sheet or by a characteristic of the cut sheet. The fifth sensor is actuated by the cut sheet as the cut sheet moves on to an orientation table. Actuation of this sensor or detector provides a signal used to signal the motors driving the endless moving belts to stop thus stopping the advance of the cut sheet in a predetermined position.

It is desired that the cut sheet be stopped in a predetermined location on the orientation table so that the sheet may be grasped by each of a pair of sheet grippers at predetermined locations on the sheet. Preferably each sheet gripper, of a pair of sheet gripper, grasps a sheet at opposite corners of the leading edge and at a predetermined location relative to the same adhesive stripe on the sheet. Thus, each sheet is grasped in the exact same locations by each of two grippers. This is accomplished while the sheet is stopped on the orientation table.

In a preferred arrangement of the invention, each sheet gripper is carried by its own linear motor along a rail. Each motor moves its associated sheet gripper along the rail independent of the other, prior to gripping the sheet. Each motor is operated to location by a sensor individual to the motor. Prior to grasping the stopped sheet, the sheet gripping assembly, including a linear motor, a sheet gripper carried on the motor and a sensor carried on the motor, is located down stream from the stopped sheet. The sheet gripping assembly travels upstream and downstream in the direction of travel of the cut sheet along an overhead rail. In the sheet gripping procedure, the sheet gripping assembly travels toward the stopped cut sheet. The sensor looks at the surface of the sheet on which is printed the adhesive stripes or lines.

In order to ensure that a contrast in color exists between the normal color of the continuous web or substrate and the color of the adhesive stripes printed on the continuous web, a color may be added to the adhesive prior to the printing process.

The sensor carried on the linear motor and looking at the surface of the sheet effectively controls the motor relative to locating the sheet gripper for grasping the sheet. The sensor is adjusted so as to ignore the first adhesive stripe off the leading edge whether that stripe be a whole stripe or part of a whole stripe. The sensor will then stop the linear motor, or will provide a signal to stop the linear motor when the zone of sensitivity of the sensor is split by the next appearing clear stripe and the following adhesive stripe. When the motor is stopped the sheet gripper is closed so as to grasp the sheet. In this way each cut sheet is grasped exactly the same way in exactly the same place relative to the same adhesive stripe on the sheet.

The cut piece is now held by each gripper of the pair of grippers and by the vacuum holding the piece against the upper surface of the endless moving belt of the second table now stopped. The linear motors are then moved uniformly downstream carrying the grippers now holding the leading edge of the cut sheet. This applies a forward pulling pressure on the sheet at the leading edge and a resistance to the forward pulling pressure by the vacuum exerted on the sheet through the porous belt of the second endless moving belt. This results in drawing the cut sheet into a flat, taut condition. The linear motors move downstream drawing the sheet to a predetermined position relative to a fixed pair of hole punching devices. When the sheet is in such predetermined position, the pair of hole punching devices punch two spaced holes in the sheet, one hole adjacent each edge of the cut sheet.

It will be seen that each gripper was oriented into position to grasp the sheet by aligning the sensor associated with the gripper on the same adhesive stripe on the sheet. Thus with the linear motors now drawing the sheet forward or downstream uniformly to a predetermined position under a pair of fixedly located hole punching devices, the holes punched in the sheet by the fixed hole punching devices are related in position to the adhesive stripes on the cut sheet.

It is desired that successive appearing sheets are punched with holes in offset relationship, relative to the same adhesive stripes on the sheets. Thus, with the hole punching devices held in a fixed position along the path of travel, every alternate sheet is drawn to the same one of two positions. This results in successive sheets having holes offset from each other with the offset of the holes related to the adhesive stripes on the sheet.

After each sheet is punched with a pair of holes, the sheet is drawn by the grippers to a stacking table where the sheets are stacked.

The stacking table includes a pair of upright aligning pins which are spaced so that the longitudinal axis of each pin aligns with the center of one of the holes respectively, that are punched in the sheet. The pins are passed through the holes as the sheet settles on the bed of the stacking table. This automatically aligns the sheets in the stack in interleave configuration, i.e., in a staggered relationship relative to adjacent sheets in the stack. The gripping devices release the sheet and move so as to clear the sheet and permit the sheet to lie flat on the stacking table bed. The spaced hole aligning pins are a snug fit in the holes in the sheet so that each sheet is precisely offset relative to adjacent sheets.

Since each sheet was precisely grasped relative to the same correspondingly positioned adhesive stripe and each alternate sheet was moved to one of two precise positions respectively, for hole punching, then with the sheets stacked on aligning pins passing through the holes in the sheets, the adhesive lines on adjacent sheets are precisely offset in horizontal planes, as a function of the stacking and are offset in vertical planes as a function of the offset holes on the aligning pins.

It has been found that during removal of the stacked sheets from the aligning pins the sheets very often slide, relative to each other destroying the alignment and offset attained. In order to avoid slippage between sheets of the stack, the sheets are secured one to the other, at the edges, while the sheets are on the aligning pins. Preferably the sheets are secured, one to the other, at their edges, as the sheets are stacked, such that each sheet is secured to its adjacent sheet.

In the preferred embodiment of the invention structure is provided to cut a succession of sheets of precisely the same length from a continuous web having one surface containing a precise pattern of adhesive stripe extending across the width thereof. Each successive sheet is drawn to a predetermined position along a path of travel and is grasped by each of a pair of sheet grippers in exactly the same location, relative to the adhesive stripes on the sheet. Each sheet is drawn by the sheet gripping device to a predetermined position relative to a pair of fixed position hole punching devices so that two spaced holes may be punched in each successive sheet. Each successive sheet is moved to a different one position, of two positions, under the hole punching devices so that the holes punched in successive sheets are offset in zigzag form. Since each successive sheet is grasped by the sheet gripping devices in the same identical place, relative to an identically located adhesive stripe on the sheet and each alternate sheet is moved to an identical position of two different positions, then the holes punched on each successive sheet will be offset alternately from correspondingly located adhesive stripes on successive sheet.

Alternatively, each sheet may be grasped in the same location on the sheet and the sheet grippers may either hold the sheet in a fixed position or move each successive sheet to the same, identical location and the hole punching devices may be re-positioned, first to one position for one sheet, then to a second position for the next sheet, then to the first position for the following sheet and so forth.

With the holes punched in successive sheets in offset location between successive sheet, when the sheets are stacked successively on aligning rods passing through the holes, a stack of sheets is generated in which the adhesive stripes on adjacent sheets are offset in horizontal planes, which is a function of the stacking, but are also offset in vertical planes, which is a function of the aligning the offset holes in the sheets.

Securing of the stacked sheets, one to the other to prevent slippage between sheets may be accomplished after all the sheets are stacked or may be accomplished one on one, as the sheets are stacked. Preferably, adhesive spotting of adjacent sheets, at their edge, is done on a diagonal, up the side of the stack.

As the sheets are being stacked, a counting device may be used to count the sheets placed on the stacking table so the number of sheets in the stack is known, Stacks of sheets of predetermined number may be removed from the cutting and stacking apparatus and placed on a pressure and heat applying apparatus which may cure the adhesive so that each sheet becomes cemented to its adjacent sheet in a predetermined pattern. After curing, the stack of sheets may be opened, forming a cellular structure.

It is within the state of the art to control the various motors relative to stop and go, speed and distance of travel by a computer. The various signals generated by the sensors or detectors may be fed into the computer, and the computer may be programmed to operate the machine. This will include the opening and closing of the trap door for waste material and the operation of the shearing device and sheet gripper assembly. The securing of the sheet edges, one to the other, in the stack of sheets may also be computer controlled.

BRIEF DESCRIPTION OF THE DRAWINGS

FIGS. 1 and 1a fit together to represent a preferred embodiment of the invention;

FIG. 2 represents a section of a continuous web, prepared with an adhesive stripe pattern and a termination or defect stripe printed thereon;

DESCRIPTION OF THE INVENTION

Figure 1A:
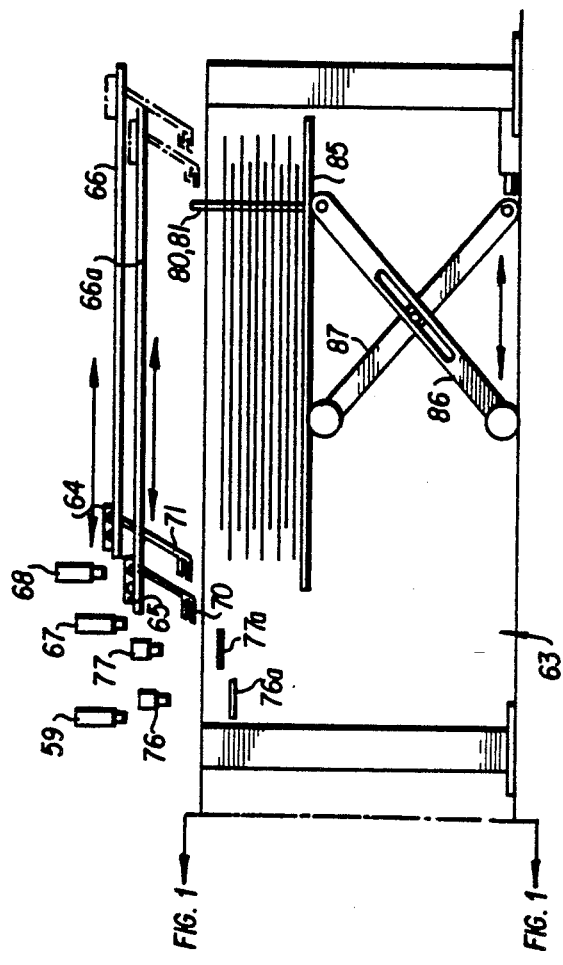

The FIGS. 1 and 1a are assumed connected, as indicated by the arrows, forming a continuous web cutting and stacking apparatus.

A roll 10 of a prepared continuous web is supported on a roll-off stand. The web 15 is represented as passing under a roller 16, which may be an idler roller or a driven roller which draws the web from the roll 10. Two web moving tables 18 and 19 are represented, each of which support an endless belt arrangement for moving the web forward. The table 18 supports a variable speed motor 20 connected to and driving a drive bar 21, by a drive belt 22. Arrows indicate the direction of travel of the belts. The motor is connected to a control, (not shown) which controls the on/off status and the speed of the motor. The roller 21 drives an endless belt 23 in the direction indicated by the arrow 24. The idler bars 26 and 27 are supported in the table and hold the belt 23 so the belt portion between the bars 26 and 27 forms the surface of the table 18. Under the belt 23 between the idler rollers 26 and 27 is a vacuum manifold 30. The under surface of the belt 23 is in sliding contact with the edge of a vacuum manifold 30, forming a seal over the face of the manifold. The endless drive belt is porous so that the vacuum draws through the drive belt 23 above the manifold.

A spring 31, connected to the drive bar 21 keeps the drive belt 22 and endless belt 23 taut. The drive belt assembly is supported on a table or table frame represented by the legs 33 and 34. A tube 35 leads from the vacuum manifold 30 to a vacuum device (not shown).

The web 15 from the roll 10 is fed under the roller 16 and on to the upper surface of the endless belt 23. In practicing the invention a holder 37 is used at the edge of the table 18, where the web 15 is introduced to ensure that the web is hold flush against the endless belt in order that the vacuum, drawing through the porous endless belt, pulls the web flat against the upper surface of the endless belt. This holder may be a group of rollers or ball bearings set in a frame which ride on the top of the web as the web is introduced to the endless belt 23.

With respect to the sheet material of the continuous web, a portion of the prepared sheet is represented in FIG. 2. The sheet 15 has printed, on one of the surfaces, a pattern of stripes of adhesive 40, spaced by clear spaces 42. It will be noted that the leading edge 44 of the continuous web may not be straight across and a defect or termination mark 45 is printed along the edge, running parallel with the direction of travel indicated by arrow 46. This termination mark is also put on the end of the long sheet and at places between the ends where a defect in either the sheet and/or the printing of the adhesive stripes has been noted.

The termination mark 45 may be a contrasting colored stripe that may be detected by a sensor 50 which provides a signal indicating that the motor 20 driving the endless belt 23 should be slowed down. The same signal is also used to alert a sensor 51 that the stripe is approaching. The sensors 50 and 51 may be photo sensors which respond to change in light and dark or contrasting colors and provide signals in response to a change in the character or change in color of the material passing through the zone of sensitivity of the sensor. The sensor 51 is positioned close to and upstream from a cutter or shearing apparatus 52. By incorporating a delay in the detection signal of sensor 51 passage of the termination or defect stripe beyond the cutter 52 may be assured. In response to a combination of signals provided by sensors 50 and 51, the trapdoor 54 is opened, the motor 20 is stopped, thus stopping the endless belt 23, and the cutter 52 cuts the web 15 transverse to the direction of travel of the web. A container 55 catches the waste cut portion 15a of the web which falls through an opened trap door 54.

After cutting or shearing the raw edge of the continuous web, the cutter returns to standby position, clear of the web and a signal is provided. In response to this signal the trapdoor is closed, the motor 20 is started, and the web 15 is advanced to the table 19.

It will be appreciated that the various signals may be fed to a control box or into a computer that is programmed to control the apparatus. The apparatus may also be controlled manually. Automated operation, under computer control, is the preferred operation of this apparatus, as automated operation will produce optimum production over the long range.

Table 19 includes an endless belt 57, driven by a variable speed motor 58. The belt 57, which is porous, is supported by two idler bars which are mounted in the table 19. The moving endless belt 57 forms the surface of the table 19. The moving belt 57 covers the top of a vacuum manifold 60 which forms a vacuum chamber, such as described on table 18. The vacuum used in conjunction with the vacuum manifold 60 is independently controlled, relative to the vacuum used in conjunction with vacuum manifold 30, of table 18. Alternatively motors 20 and 58 can be combined into one motor with a variable gear ratio so that belt 57 travels faster than belt 23. The newly cut leading edge of the web is advanced by the drive belt 57, with the web 15 held firmly against the surface of the belt on table 19 by the vacuum in manifold 60. As the leading edge advances downstream, the leading edge is detected by a sensor 61, which provides a signal indicating that the web advance should be slowed down. This avoids override of the motor when the motor is stopped. The signal also alerts sensor 62 that the leading edge is approaching. When the sensor 62 detects the leading edge the advance of the web is precisely stopped and the cutter cuts the web. The sensors 61 and 62 may be the same type of sensor as sensor 50 or 51, for example.

The position of sensor 62 and/or the location of the leading edge when the advance of the web is stopped determines the length of the sheet cut from the web.

The cut sheet is advanced rapidly to the orientation table 63 while the main portion of the web with a newly cut leading edge is advanced over the closed trap door toward the drive belt 57. The motors 20 and 58 are independently controlled and may be operated at different speeds, as required.

At this stage, the leading edge of the cut sheet is advancing toward a predetermined position on the orientation table 63 while a trailing portion of the sheet is on the endless belt 57 of table 19, held against belt 57 by the vacuum in vacuum manifold 60. When the leading edge of the cut sheet is detected by a sensor 59 as entering a predetermined position on orientation table 63 a signal from sensor 59 is provided, indicating that the motor 58 driving endless belt 57 is to be stopped.

The predetermined position, for stopping the advance of the cut sheet on the orientation table is when the leading edge of the sheet is far enough on to the orientation table so that the surface of the leading portion of the sheet may be scanned by each of a pair of sensors 67 and 68 and each sheet gripper of a pair of sheet grippers may grasp the sheet just inside the leading edge of the sheet and the trailing section of the sheet is remains held against the surface of the endless belt 57 by the vacuum in vacuum manifold 60.

Figure 4A:
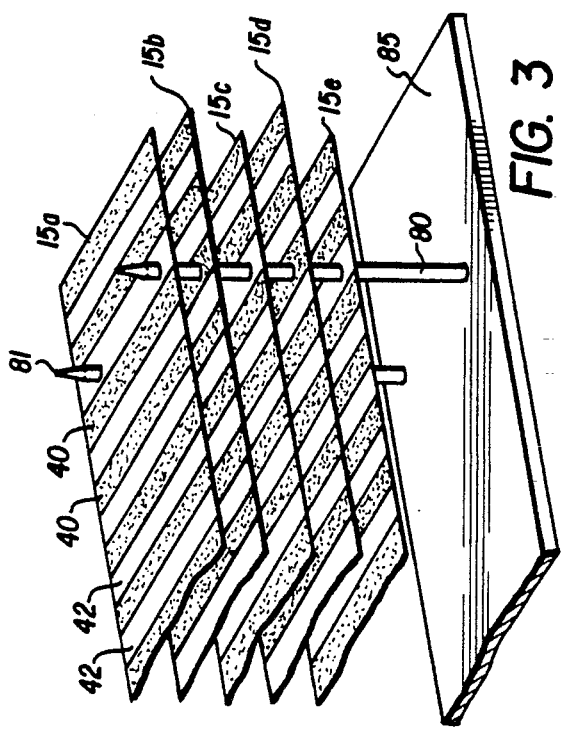
FIG. 4a represent the sheet gripper closed on the sheet with a sensor showing the projected zone of sensitivity; and, FIG. 5 represents a stack of sheets on aligning pins with securing spots and a spot applying device.
Figure 4:
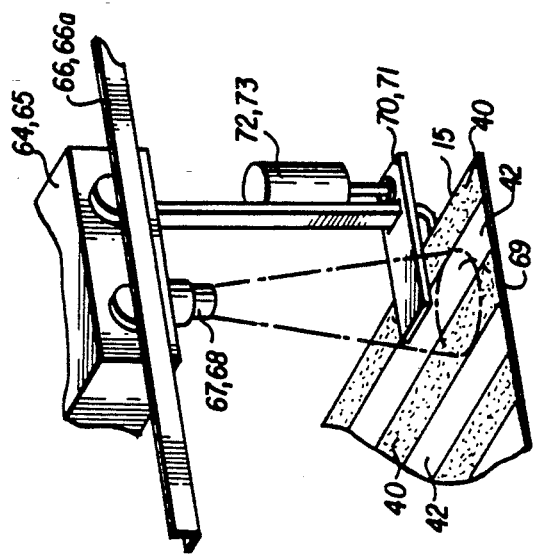
FIG. 4 represents a sheet gripper assembly unit over a sheet.

The sheet gripping assembly is more clearly represented in FIGS. 4 and 4a.

The sheet gripping assembly includes a pair of rails 66 and 66a suspended over the surface of the table 63. On each rail, which may be a pair of rails each, rides a linear motor carrying a sensor and a sheet gripper with sheet gripper actuator.

The linear motor 64 rides on rail 66 and carries sensor 67 and sheet gripper 70 along with sheet gripper actuator 72.

Linear motor 65 rides on rail 66a and carries sensor 68 and sheet gripper 71 along with sheet gripper actuator 73.

The rails 66 and 66a are positioned and spaced so that each sheet gripping unit is located over the plane in which the cut sheet lies and just inside the edges of the sheet that is, edges as opposed to the leading end, referred to as the leading edge of the sheet.

The linear motors are, when approaching the leading edge of the sheet independently driven but when the sheet has been grasped by each unit, the linear motors 64 and 65 are effectively operated uniformly, in unison.

Mounted on each motor, essentially in identical locations is a sensor 67, on motor 64 and a sensor 68, on motor 65. Each sensor looks down on the sheet seeing the surface which has the pattern of adhesive lines and spaces thereon. Each sensor is sharply tuned and adjusted to ignore the first adhesive stripe 40 on the sheet and to provide an optimum or useful signal when its zone of sensitivity is exactly split by the first clear strip 42 on the sheet and the second adhesive stripe 40 on the sheet. This is represented in FIG. 4.

When the respective sensor 67 or 68 sees this combination, the linear motor, under the control of the particular sensor is stopped. In this condition the bottom jaw of the sheet gripping device is under the sheet and the upper jaw is above the sheet. A jaw actuator 72 closes the sheet gripping device by lowering the upper jaw on to the top of the sheet so that the sheet is grasped between the upper and lower jaws of the sheet gripping device. The jaw actuator may be a solenoid, for example.

Both sheet gripping devices and both sensors are identically mounted on respective linear motors so that with each sensor 67 and 68 finely and sharply tuned each sheet gripping device 70 and 71 will grasp the sheet in exact corresponding positions near opposite edges of the sheet.

Prior to gripping the sheet, driving the respective sheet gripping unit of the assembly is independently carried out, with the positioning of each sheet gripping unit relative to the same adhesive stripe on the same sheet. After each unit of the sheet gripping assembly has independently secured the sheet, the movement of each linear motor is preferably simultanious and identical, relative to each other.

The hole punching devices are in fixed positions. Thus, the location of the holes punched in the sheet are related to the same adhesive stripe on the sheet. By driving the motors carrying the sheet to a first predetermined position for a first sheet, then to a second predetermined position for the second sheet then to the first predetermined position for the third sheet, then to the second predetermined position for the fourth sheet and so on, the holes punched by fixedly located hole punching devices will be offset between successive sheets and when the sheets are stacked with hole aligning pins through the punched holes, the sheets in the stack will lie with the adhesive stripes of adjacent sheets offset from one another.

In order to preserve the offset relationship between adhesive lines or stripes on adjacent sheets in the stack of sheets, adjacent sheets may be adhered to each other, this to prevent sliding of the sheets in the stack.

FIG. 5 represents a stack of sheets 15a through 15g on a bed 85 with aligning pins 80/81 extending through the holes in the sheets. The thickness of the individual sheets is exaggerated to show the offset relationship between adjacent sheets and the adhesive spotting of common edges of adjacent sheets. The "X's" 95 show that the adhesive spots adhering the edges of adjacent sheets are in zig-zag arrangement. The "X's" 95a show that adhesive spots may be on a diagonal along the edge of the stack, if desired.

Adhesion of adjacent sheets may be accomplished by gluing, such as represented at 90 or by soldering or by heat fusion, if desired.

By using edge spot adhesion, slippage between sheets of the stack is avoided when the aligning pins 80/81 are removed.

Figure 3:
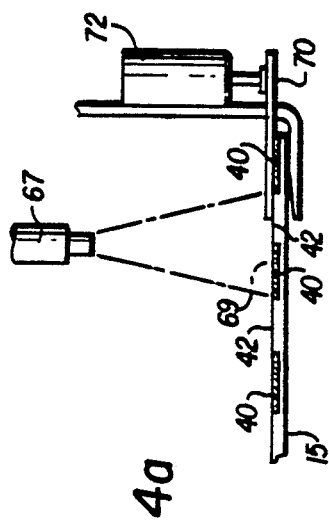
FIG. 3 represents a group of stacked, offset sheets in exploded view, located on aligning pins.

FIG. 3 represents the offset orientation of successive sheets 15a through 15e stacked, with aligning pins passing through the holes. The offset relationship of the adhesive stripes 40 and clear stripes 42 is also indicated. The width and spacing of the adhesive stripes has been exaggerated.

After holes are punched in the sheet, the sheet gripper assembly draws the sheet to a position over the stacking pins where the holes in the sheet are aligned with the pins. The sheets form a stack of sheets on the bed 85 with the aligning pins passing through the holes in each sheet of the stack.

The aligning pins 80 and 81 are preferably standing upright on the bed and are tapered at the top or tip of the pin to provide a clearance when the pin first enters the hole in the sheet in the stacking process. The lower portion of the shaft of the pin has a diameter that fits snugly in the hole so as to positively orient the sheet on the pins.

The sheet grippers release the sheet and the gripper assembly returns to prepare to grasp the next cut sheet. The sheet gripper assembly may include a sheet flattening apparatus which flattens the sheet on the stack during return of the gripper assembly to secure the next sheet.

The stacking table 85 may be moved up and down to receive the cut sheet from the grippers. This may be accomplished in several ways, one of which is indicated. The legs 86 and 87 may be pivotally attached to the bed of the stacking table 85. The extreme or floor ends of the legs may be changed in spacing so as to raise or lower the table. Alternatively the pins 80 and 81 may be raised or lowered, as desired, by a drive or solenoid (not shown) for example.

The stack of sheets secured in their offset position by the pins through the punched holes may then be removed from the table and further processed.

The continuous web 10 is printed with adhesive stripes on only one side or face of the web. Preferably, the web 15 is introduced on to the surface of the table 18 with the printed face up or exposed, placing all the adhesive stripes on the upper or exposed surface of the web 15 and the cut sheet during the cutting and stacking operations. When the sheets are stacked on the stacking table all the sheets in the stack will be facing in the same direction. This is represented in FIG. 3.

As previously stated the continuous web from which the sheets are cut had been previously prepared with adhesive stripes printed, very accurately and sharply defined and spaced, extending from edged to edge across the width of one surface of the web. The other surface is clear. When the sheets are stacked the face of the sheets containing the adhesive stripes are all facing the same direction. The sheets in the stack are stacked sheet face to sheet back and thus the pattern of adhesive stripes on one sheet of the stack is in a different horizontal plane than the pattern of adhesive stripes on the adjacent sheet in the stack. This is a function of stacking. However, there is an offset between adhesive stripes of adjacent sheets obtained by the present invention. This offset is in vertical planes.

In order to accomplish the making of a block of cells, such as a honeycomb block, for example, offset of the adhesive stripes or lines between adjacent sheets in vertical planes need be very accurate and sharply defined. This is because of the width and spacing of the adhesive stripes printed on the surface of the web. For example, for the formation of a cellular structure with ⅛ inch cells, adhesive stripes 0.070 inches wide are laid down or printed across the width of a continuous web at a spacing of 0.280 inches. The offset, in the vertical plane between adhesive stripes on adjacent sheets in a stack of sheets need be 0.175 inches. It will be appreciated that cellular structures formed with cells other than ⅛ inch will require different width adhesive stripes at different spacing between adhesive stripes and a different offset between adhesive stripes of adjacent sheet in a stack of sheets.

Positioning of the various components of the apparatus of the invention and movement of the sheet gripper assembly may be adjusted to provide sheets of different length, as desired and provide different offset between adhesive stripes of adjacent sheets and still maintain consistence accuracy.

It should be mentioned that when the cut sheet is secured by the grippers of the gripper assembly, the sheet may be held in a substantially flat position by having the leading portion of the sheet pulled forward by the grippers and having the vacuum through the endless belt retard the advancement of the sheet. Although advancement of the sheet is retarded by the vacuum hold on the sheet, the sheet may be pulled and/or slide along the belt when pulled by the grippers. This combination of forces provides a flat, taut sheet when the gripper assembly pulls the sheet forward against the vacuum hold. The vacuum through the belt permits the sheet to move or slide forward on the belt under a forward pulling pressure, without damage to the sheet or the adhesive stripes on the sheet.

The invention has been shown and described in representation from. The type of individual component used, such as a sensor, endless belt, shear apparatus, vacuum system, punch, etc., will depend greatly on the material content of the continuous roll. Although several alternatives have been mentioned, other changes and modifications may be made, as will become apparent to those skilled in the art, without departing from the invention as defined in the appended claims.

What is claimed is:

1. Apparatus for stacking a plurality of sheets, each sheet of said plurality of sheets having a pattern of stripes across the width thereof, said plurality of sheets stacked so that the stripes of said pattern of stripes of a first sheet are offset from the stripes of said pattern of stripes on sheets adjacent to said first sheet in said stack the offset of stripes on adjacent sheets being in a vertical plane; said apparatus comprising:
   a) sheet moving means for positioning a sheet of said plurality of sheets on a sheet orienting table in a substantially predetermined position;
   b) stripe sensing means for detecting a predetermined stripe from said pattern of stripes on said sheet when said sheet is in said substantially predetermined position;
   c) sheet gripping means for gripping said sheet at a predetermined location relative to said predetermined stripe detected by said stripe sensing means;
   d) means for moving each alternate sheet of said plurality of sheets to a first location of two locations and for moving each sheet between alternate sheets to a second location of said two locations;
   e) hole punch means for punching a pair of spaced holes in said sheet when said sheet is in said first location of two locations or in said second location of said two locations;
   f) a sheet stacking bed for retaining sheets stacked thereon, said sheet stacking bed including a pair of aligning rods extending from said sheet stacking bed and spaced for passing through one hole respectively of said pair of spaced holes punched in said sheet;
   g) second sheet moving means for moving said sheet over said pair of aligning rod so that said pair of spaced holes punched in said sheet align with said pair of aligning rods; and,
   h) sheet release means for releasing said sheet held by said sheet gripping means for permitting said sheet to lie upon said sheet stacking bed with said pair of aligning rods through said pair of spaced holes punched in said sheet.

2. Apparatus for stacking a plurality of sheets as in claim 1 and in which said stripe sensing means includes a first sensor and a second sensor spaced for detecting said predetermined stripe on said sheet at spaced locations on said sheet.

3. Apparatus for stacking a plurality of sheets as in claim 2 and in which said sheet gripping means includes a first sheet gripper and a second sheet gripper, said first sheet gripper for gripping said sheet relative to said predetermined stripe sensed by said first sensor and said second sheet gripper for gripping said sheet relative to said predetermined stripe sensed by said second sensor.

4. Apparatus for stacking a plurality of sheets as in claim 1 and further including sheet edge spotting means for adhering a common edge of adjacent sheets in said stack.

5. Apparatus for stacking a plurality of sheets as in claim 1 and further including means for holding together common edges of adjacent sheets in said stack of sheets for preventing slippage between adjacent sheets.

6. Apparatus for stacking a plurality of sheets as in claim 1 and in which said stripe sensing means and said sheet gripping means are each mounted on a motor means for moving said stripe sensor means and said sheet gripping means in unison.

7. Apparatus for stacking a plurality of sheets as in claim 3 and further including a first motor means and a second motor means, said first motor means for moving said first stripe sensor and said first sheet gripper in unison and said second motor means for moving said second stripe sensor and said second sheet gripping means in unison.

8. An apparatus for cutting a continuous web into sheets of predetermined length and for stacking the sheets so cut, in a precise position, relative to each other, said apparatus comprising:

a) a means for securing a portion of said continuous web to a moving surface for moving said portion of said continuous web in a predetermined direction of travel;

b) a web shearing means for cutting said continuous web transverse to said predetermined direction of travel for forming a leading edge on said continuous web and for cutting said continuous web into sheets;

c) a web stop means, positioned downstream in said predetermined direction of travel from said web shearing means, for stopping said continuous web with said leading edge in a predetermined relationship to said web stop means for cutting said continuous web into a cut sheet of predetermined length by said web shearing means;

d) a detector means for detecting each of two laterally spaced, predetermined points on said cut sheet for orienting said cut sheet in accordance with a position of said detector means, said detector means positioned in a first predetermined position when detecting said two laterally spaced, predetermined points on a first cut sheet for orienting said first cut sheet in a first predetermined oriented condition and said detector means positioned in a second position when detecting said two laterally spaced predetermined points on a next cut sheet for orienting said next cut sheet in a second predetermined oriented condition;

e) a hole punch means for punching a first hole and a second hole in each said cut sheet when said cut sheet is oriented in accordance with said position of said detector means, said detector means being positioned at said first predetermined position when said first hole and said second hole are punched in said first cut sheet and said detector means is positioned at said second predetermined position when said first hole and said second hole are punched in said next cut sheet for offsetting said first hole and said second hole in said first cut sheet from said first hole and said second hole in said next cut sheet; and f) a first pin and a second pin extending from a stacking bed, said first pin and said second pin spaced laterally from each other so that said first hole and said second hole align with said first pin and said second pin, respectively, and said first pin passes through said first hole and said second pin passes through said second hole when said cut sheet is on said stacking bed for offsetting adjacent cut sheets, in a stack of cut sheets on said stacking bed, from each other.

9. An apparatus for cutting a continuous web into sheets of predetermined length and for stacking the sheets so cut, in a precise position, relative to each other, said apparatus comprising:

a) a means for securing a portion of said continuous web to a moving surface for moving said portion of said continuous web in a predetermined direction of travel;

b) a web shearing means for cutting said continuous web transverse to said predetermined direction of travel for forming a leading edge on said continuous web and for cutting said continuous web into sheets;

c) a web stop means, positioned downstream in said predetermined direction of travel from said web shearing means, for stopping said continuous web with said leading edge in a predetermined relationship to said web stop means for cutting said continuous web into a cut sheet of predetermined length by said web shearing means;

d) a detector means for detecting each of two laterally spaced, predetermined points on said cut sheet for orienting said cut sheet in a predetermined oriented position;

e) a hole punch means for punching a first hole and a second hole in each said cut sheet when said cut sheet is in said predetermined oriented condition, said hole punch means positioned at a first predetermined position for punching said first hole and said second hole in a first cut sheet at first predetermined positions when said first sheet is in said predetermined oriented condition and said hole punch means positioned at a second predetermined position for punching said first hole and said second hole in a next cut sheet at second predetermined positions when said next cut sheet is in said predetermined oriented condition for offsetting said first hole and said second hole in said first cut sheet from said first hole and said second hole in said next cut sheet; and f) a first pin and a second pin extending from a stacking bed, said first pin and said second pin spaced laterally from each other so that said first hole and said second hole align with said first pin and said second pin, respectively, and said first pin passes through said first hole and said second pin passes through said second hole when said cut sheet is on said stacking bed for offsetting adjacent cut sheets, in a stack of cut sheets on said stacking bed, from each other.

* * * * *